UNITED STATES PATENT OFFICE.

BEST AVAILABLE COPY

DAVID W. BIRMINGHAM, OF CLIFTON, NEW YORK.

PROCESS OF ROASTING AND DISINTEGRATING GOLD AND SILVER ORES.

SPECIFICATION forming part of Reissued Letters Patent No. 10,400, dated November 6, 1883.

Original No. 283,461, dated August 21, 1883. Application for reissue filed October 11, 1883.

*To all whom it may concern:*

Be it known that I, DAVID W. BIRMINGHAM, a citizen of the United States, residing at Clifton, in the county of Richmond and State of New York, have invented certain new and useful Improvements in Processes of Roasting and Disintegrating Gold and Silver Ores, of which the following is a specification.

My invention relates to the manipulation and treatment of ores of the precious metals, especially those having refractory bases, the object being to obtain a more thorough, speedy, and convenient desulphurization of such ores without fluxing or slagging the same, and to prepare the ores for a more perfect and effectual amalgamation, whereby I obtain a higher percentage of value from a given quantity of ore than is otherwise possible.

To this end my invention consists in mechanically combining the broken ores with a bulk of broken charcoal of any required size, and any salt of lime, preferably the hydrate, and artificially roasting the said ores so combined in any reverberatory or other furnace suitable for the purpose, and subsequently subjecting the charge to a bath of water, but preferably of a solution of common salt, cyanide of potassium, and sulphate of copper, or to any suitable bath of saline or acid solution used singly or in combination, according to the refractory bases of the ore.

In carrying out my invention I first break the ores by any suitable crushing mechanism to any suitable degree—say to a size, preferably, of gravel, or finer, according to the rebellious qualities of the ore. With the crushed ore are then mingled broken charcoal or other carbonaceous material and lime in the proportion, say, of about one bushel (more or less) of each to one ton of the ore. While I may use any form of lime for this purpose, the hydrate is to be preferred, and although the proportions of the lime to the charcoal mentioned may be taken as the standard, it should be noted that this is subject to variation according to the fusible character of the ore under treatment, the fusion of which it is desired to prevent.

The art or principle of working is as follows: The ores mechanically crushed in the above manner, and in bulk of about half a ton, are then admitted through a suitable aperture into the upper end—say, of a reverberatory furnace having, preferably, an inclined hearth, or in any suitable furnace—and then subjected to a gradual roast by impinging upon the mass the heat or flame derived from a fire made from wood or any suitable material, the important feature being to gradually raise the temperature of the ore as high as possible without slagging the same, or to such a temperature as may seem requisite for the elimination of the bases. The charge at the upper end of the furnace, being most remote from the fire, receives during the roast the least degree of heat, which is from time to time increased as the treatment of the ores under manipulation and their character may suggest by approaching the same nearer to the fire located at the other end of the furnace, and is accomplished, ordinarily, in reverberatory furnaces by rakes or other tools made and used for that purpose. At each periodical movement down or removal of said ores to a nearer approach to said fire after a discharge of similar quantity of roasted ores, another charge of similar bulk is admitted, as before, and this plan is pursued until the gases, fumes, and refractory bases are eliminated, when, by an exit in the hearth constructed for the purpose, they are discharged at a red, white, or intermediate heat, as the case may require, into a bath, as herein more fully set forth.

The presence of lime and charcoal gives to the mass a light, puffy, buoyant consistency, holding the ore, as it were, in suspension, and giving an even and equally-distributed heat throughout the same, the lime being herein used and applied in the management of the roast as a prevention to slagging the ores, and, like the charcoal, and in conjunction therewith, acts as an absorbent and decomposer of the rebellious constituents.

It should be also noted that while I may use the combination of lime and charcoal, as specified, I am not to be restricted to their combined use with all classes of ores in the manner referred to; but I may defer using either of these materials when they or their equivalents are found in natural combination with the ores themselves—tha is to say, for instance, when ores contain sufficient lime in themselves I may simply use the charcoal therewith, and when ores require less heat I may use the lime alone with the ores.

Now, when I have prepared the ores by a thorough roast in the manner before described, after their desulphurization, and the ores at proper temperature of heat, I at once discharge them into a water-bath, or bath composed, preferably, of an aqueous solution of chloride of sodium, cyanide of potassium, and sulphate of copper prepared in the following manner. Within a vat or car made of suitable dimensions and used for receiving the discharge I form a solution of common salt, sulphate of copper, and cyanide of potassium with water, the proportions being about one pound (more or less) of each of the substances named, to a sufficient volume of water to cover the bulk of ore roasted at a single operation, salt being added to the point of saturation. While I may use this combination, preferably, as a whole, I may also use them separately or in following quantities, to wit: say one pound of the cyanide of potassium to a sufficient quantity of water to cover the ore, salt being added to saturation; or, say, one pound of the sulphate of copper to a like quantity of water, with salt added to saturation, or in accordance with the quality and refractory condition of the ore to be treated. I may use any saline or acidulated bath, singly or in combination, as while some ores are successfully treated in one solution other ores may require and be more advantageously treated in a solution composed of different ingredients. The action of the roast in combination with this bath upon the heated ores effects their disintegration, leaving them in a friable condition, in which they are readily crumbled or pulverized, thereby effecting a separation of the bases, setting free the precious metals, and leaving the ores in condition for amalgamation.

This process, aside from its advantages, secures much economy as compared with other methods.

What I claim is—

1. In the separation of gold and silver from their ores, the process herein described of preparing said ores for amalgamation, consisting in mechanically combining therewith lime and charcoal, and roasting the mixture in a suitable furnace, and subsequently plunging the hot ore into a suitable bath, substantially as described.

2. The process described of preparing gold and silver ores for amalgamation, said process consisting in combining lime and charcoal, or their equivalents, with said ores, roasting them in conjunction with said substances, and plunging the hot ore after roasting into a bath composed of an aqueous solution of common salt, cyanide of potassium, and sulphate of copper, or their equivalents, substantially as described.

In testimony whereof I have hereunto set my hand in presence of two subscribing witnesses.

DAVID W. BIRMINGHAM.

Witnesses:
WILLIAM FROST,
L. L. LOMBARD.